(12) United States Patent
Liu et al.

(10) Patent No.: US 10,942,319 B2
(45) Date of Patent: Mar. 9, 2021

(54) OPTICAL MODULE

(71) Applicant: HISENSE BROADBAND MULTIMEDIA TECHNOLOGIES CO., LTD., Shandong (CN)

(72) Inventors: Xuxia Liu, Shandong (CN); Shijian Ben, Shandong (CN)

(73) Assignee: HISENSE BROADBAND MULTIMEDIA TECHNOLOGIES CO., LTD., Shandong (CN)

(*) Notice: Subject to any disclaimer, the term of this patent is extended or adjusted under 35 U.S.C. 154(b) by 0 days.

(21) Appl. No.: 16/496,354

(22) PCT Filed: Aug. 19, 2019

(86) PCT No.: PCT/CN2019/101399
§ 371 (c)(1),
(2) Date: Sep. 20, 2019

(87) PCT Pub. No.: WO2020/035074
PCT Pub. Date: Feb. 20, 2020

(65) Prior Publication Data
US 2020/0285004 A1    Sep. 10, 2020

(30) Foreign Application Priority Data
Aug. 17, 2018 (CN) .......................... 201810942487.3

(51) Int. Cl.
*G02B 6/42* (2006.01)
*H04B 10/40* (2013.01)
*H04B 10/50* (2013.01)

(52) U.S. Cl.
CPC ......... *G02B 6/4214* (2013.01); *G02B 6/4257* (2013.01); *G02B 6/4206* (2013.01); *H04B 10/40* (2013.01); *H04B 10/503* (2013.01)

(58) Field of Classification Search
None
See application file for complete search history.

(56) References Cited

U.S. PATENT DOCUMENTS

| 2013/0094807 A1 | 4/2013 | Shao et al. |
| 2015/0086165 A1* | 3/2015 | Morioka ............. G02B 6/4214 385/93 |

FOREIGN PATENT DOCUMENTS

| CN | 103635844 A | 3/2014 |
| CN | 105572816 A | 5/2016 |
| TW | 201346369 A | 11/2013 |

OTHER PUBLICATIONS

First Office Action issued in CN Application No. 201810942487.3, dated Jun. 6, 2019, with English Translation.

* cited by examiner

*Primary Examiner* — Jerry Rahll
(74) *Attorney, Agent, or Firm* — Harness, Dickey & Pierce, P.L.C.

(57) ABSTRACT

The present application provides an optical module, including a laser, a laser driving chip, and a lens component disposed above the laser and the laser driving chip, where an inner cavity wall of the lens component that faces towards the laser and the laser driving chip is provided with a transmitting lens; a surface of the transmitting lens and the inner cavity wall around the transmitting lens are coated with a reflective film; and there is no reflective film coated on a part or entire of a region, of the inner cavity wall of the lens unit, which is irradiated by a secondarily reflected laser light.

6 Claims, 5 Drawing Sheets

OPTICAL MODULE

CROSS-REFERENCE TO RELATED APPLICATIONS

The present application is the U.S. National Phase Application under 35 U.S.C. 371 of International Application No. PCT/CN2019/101399 filed on Aug. 19, 2019, which claims priority to a Chinese Application No. 201810942487.3, filed with the Chinese Patent Office on Aug. 17, 2018 by HISENSE BROADBAND MULTIMEDIA TECHNOLOGIES CO., LTD and entitled "OPTICAL MODULE". The entire disclosures of the above applications are incorporated herein by reference in their entirety.

FIELD OF THE INVENTION

This disclosure relates to a field of fiber communications technologies, and in particular, to an optical module.

BACKGROUND OF THE INVENTION

In a fiber communications system, an optical module is a connection module that has an optical-to-electrical conversion function. A typical optical module usually includes two parts: a transmitting end and a receiving end. The transmitting end is configured to convert an electrical signal into an optical signal and then transfer the optical signal out by using a fiber. The receiving end is configured to convert the optical signal transferred by the fiber into an electrical signal.

SUMMARY OF THE INVENTION

Embodiments of the present application provide an optical module, so as to resolve a problem, occurring when a laser driving chip in an optical module according to the prior art is irradiated by laser light, that a working stability of the optical module is degraded.

According to an embodiment of the present application, there is provided an optical module. The optical module primarily includes a laser and a laser driving chip that are disposed on a circuit board, and a lens component disposed above the laser and the laser driving chip, wherein the lens component is provided with a transmitting lens for collimating and converging laser light emitted by the laser on an inner cavity wall of the lens component that faces towards the laser and the laser driving chip, and a surface of the transmitting lens and the inner cavity wall around the transmitting lens are coated with a reflective film;

the laser driving chip is provided with a clock data recovery circuit in a non-edge region thereof, and the optical module is configured to reflect, by the reflective film on the surface of the transmitting lens, a part of the laser light emitted by the laser, and reflect secondarily, by an edge region of the laser driving chip, the laser light reflected by the reflective film to be irradiated onto the inner cavity wall of the lens unit, wherein there is no reflective film coated on a part or entire of a region, of the inner cavity wall of the lens unit, which is irradiated by the secondarily reflected laser light.

According to an embodiment of the present application, there is further provided another optical module. The optical module primarily includes a laser and a laser driving chip that are disposed on a circuit board, and a lens component disposed above the laser and the laser driving chip, wherein the lens component is provided with a transmitting lens for collimating and converging laser light emitted by the laser on an inner cavity wall of the lens component that faces towards the laser and the laser driving chip, and a surface of the transmitting lens and the inner cavity wall around the transmitting lens are coated with a reflective film;

the laser driving chip is provided with a clock data recovery circuit in a non-edge region thereof, and the optical module is configured to reflect, by the reflective film on the surface of the transmitting lens, a part of the laser light emitted by the laser, and reflect secondarily, by an edge region of the laser driving chip, the laser light reflected by the reflective film to be irradiated onto the inner cavity wall of the lens unit; and a distance between a boundary of the reflective film on a side closer to the laser driving chip and a center of the transmitting lens is less than $f(h_1, R, f_1, \theta)$, wherein $$f(h_1, R, f_1, \theta) = \frac{h_1 * \sin(2\theta_2 - \theta)\cos\theta + f_1\sin2\theta_2}{\cos(2\theta_2 - \theta)\cos\theta},$$

$$\theta_2 = \theta + \arctan\frac{f_1\tan\theta}{R},$$

indicates a distance between the inner cavity wall of the lens component and an upper surface of the laser driving chip, R indicates a curvature radius of the transmitting lens, $f_1$ indicates a distance between the surface of the transmitting lens and a light-emitting cavity surface of the laser, and $\theta$ indicates a maximum divergence angle of the laser.

It may be learned from the foregoing embodiments that: as to the optical module provided in the embodiments, in view of the characteristics that the inner cavity wall of the lens component in the optical module faces towards the laser and the laser driving chip, the transmitting lens is disposed on the inner cavity wall, light emitted by the laser to the lens component is reflected by a reflective film on a surface of the lens component to an edge of the laser driving chip, and then is reflected secondarily, by the edge region of the laser chip, to the inner cavity wall, it is designed that the region, of the inner cavity wall of the lens unit, which is irradiated by the secondarily reflected laser light, entirely or partially is not coated with the reflective film. By using the foregoing design, it is possible so that reflection directions of light from the inner cavity wall on the region irradiated by the secondarily reflected laser light are all or partly changed into random directions, and accordingly intensity of light reflected onto the non-edge region of the laser driving chip is reduced. In this way, performance of the clock data recovery circuit in the non-edge region of the laser chip is prevented from being interfered by excessive laser irradiation, thereby improving work stability of the optical module.

BRIEF DESCRIPTION OF THE DRAWINGS

The accompanying drawings herein incorporated into the specification and constituting a part of the specification illustrate embodiments in accordance with the present application, and together with the specification, are intended to explain the principle of the present application.

In order to describe the technical solutions in accordance with the embodiments of the present application or of the prior art to be clearer, the accompanying drawings required for the description of the embodiments or the prior art are briefly described below. Obviously, persons of ordinary skills in the art can also derive, without an effective effort, other drawings according to these accompanying drawings.

DETAILED DESCRIPTION OF THE EMBODIMENTS

To make a person skilled in the art better understand the technical solutions of the present application, the technical solutions in accordance with the embodiments of the present application will be described below to be clear and complete with reference to the accompanying drawings in accordance with the embodiments of the present application. Obviously, the described embodiments are merely a part and not all of embodiments of the present application. According to the embodiments of the present application, all other embodiments derived by one of ordinary skills in the art without an effective effort should not depart from the protection scope of the present application.

In order to ensure uniformity of light powers of all optical channels in an optical module, one-time film coating is usually performed on surfaces of all transmitting lenses in an optical lens component of the optical module, and a film coating area is required to be as large as possible. Therefore, according to the prior art, film coating is not only performed on a surface of the transmitting lens, but also a reflective film is coated, by a large area, on an inner wall of the optical lens component in a region around a group of the transmitting lenses. However, the inventor finds that when the foregoing film coating manner is applied to an optical module having a laser driving chip with a CDR (clock data recovery) module, problems may occur to the optical module that an optical-to-electrical signal conversion is poor and working is unstable. On the basis of the foregoing problems, the inventor researches and analyzes a direction of an inner reflection optical path of the optical module. Details are described as follows.

Figure 1:
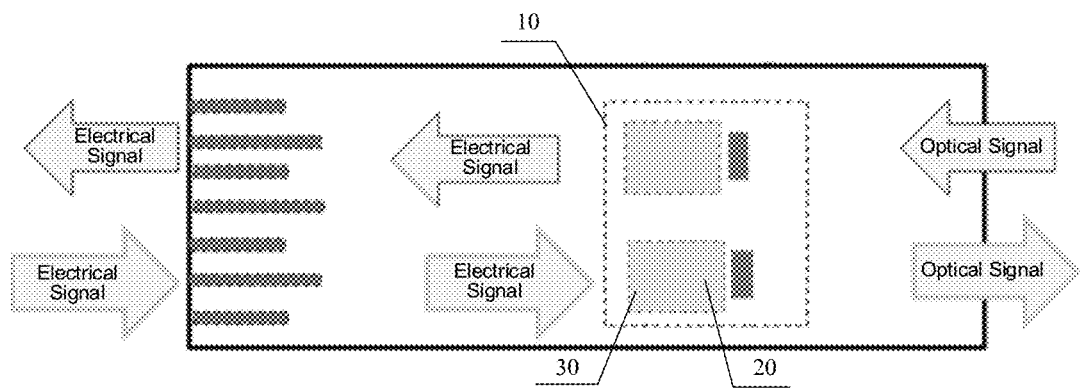
FIG. 1 is a schematic diagram illustrating a basic inner structure of an optical module according to the prior art.
Figure 2:
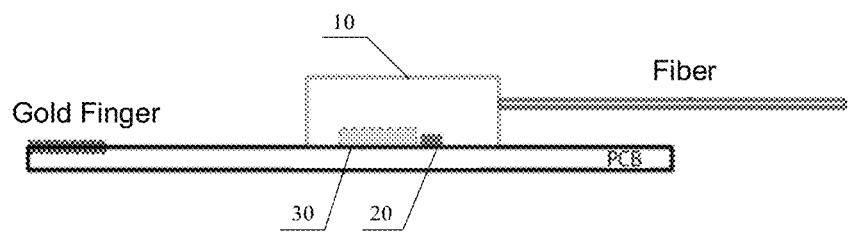
FIG. 2 is a side view illustrating the inner structure of the optical module in FIG. 1.
Figure 3:
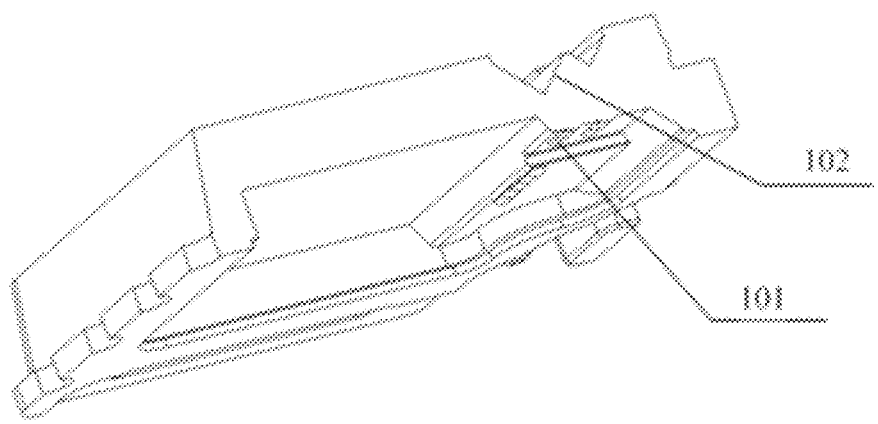
FIG. 3 is a first schematic diagram illustrating a basic structure of a lens component in FIG. 1.

FIG. 1 is a schematic diagram illustrating a basic inner structure of an optical module. FIG. 2 is a side view illustrating the inner structure of the optical module in FIG. 1. As shown in FIG. 1 and FIG. 2, most important elements in the optical module include an optical lens component 10 used by a transmitting end, a laser 20, and a laser driving chip 30 disposed at a side of the laser 20. The optical lens component 10 is disposed above the laser 20 and the laser driving chip 30. FIG. 3 is a first schematic diagram illustrating a basic structure of the lens component in FIG. 1. As shown in FIG. 3, the lens component 10 has a plurality of transmitting lenses 101 for transmitting laser light and a reflective surface 102, where each of the transmitting lenses 101 corresponds to each of the optical channels. When the optical module transmits a signal, a gold finger leads an electrical signal into the laser driving chip 30, and the laser driving chip 30 further transmits the electrical signal to the laser 20, wherein the electrical signal is converted into an optical signal by the laser 20. A laser signal transmitted by the laser 20 is firstly collimated and converged through a corresponding transmitting lens 101, is then reflected to a fiber by the reflective surface 102, and is finally transferred through the fiber.

Figure 4:
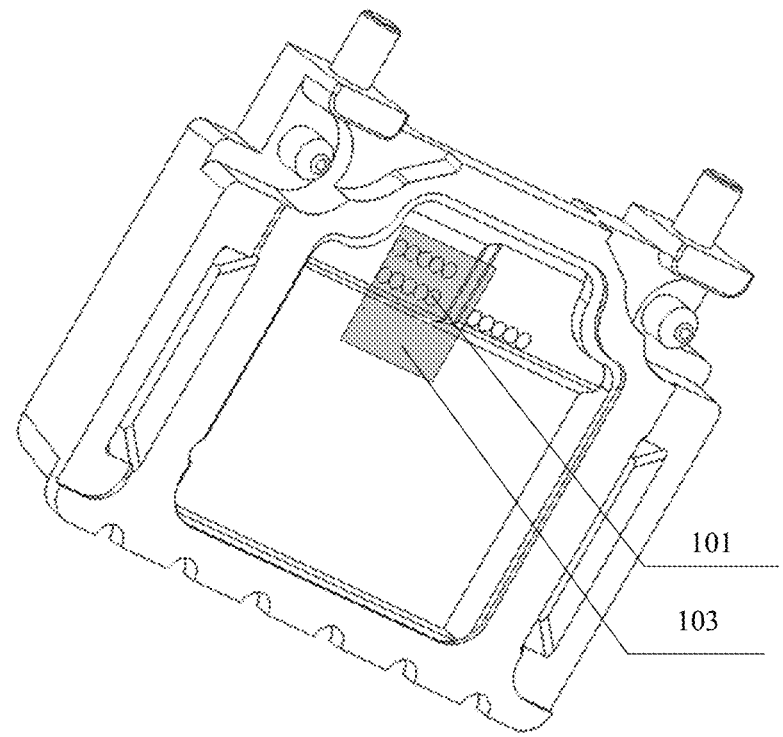
FIG. 4 is a second schematic diagram illustrating the basic structure of the lens component in FIG. 1.

FIG. 4 is a second schematic diagram illustrating the basic structure of the lens component in FIG. 1. As shown in FIG. 4, because at present the laser 20 itself has a relatively large luminous power while light emitting power actually required by the optical module is small, a reflective film is usually coated onto all lens surfaces of the group of the transmitting lenses 101 to attenuate a light power. In order to ensure uniformity of light powers of all optical channels, a film coating range is usually required to be as large as possible. Therefore, a reflective film 103 is also coated onto an inner wall of the optical lens component 10 that is in a region around the group of the transmitting lenses 101.

Due to a relatively high light reflection efficiency of the reflective film 103, the laser driving chip 30 is irradiated by excessive reflected laser light, resulting in a degradation of a working signal of the laser driving chip 30 and thus a of degradation of a working stability of the optical module.

Figure 5:
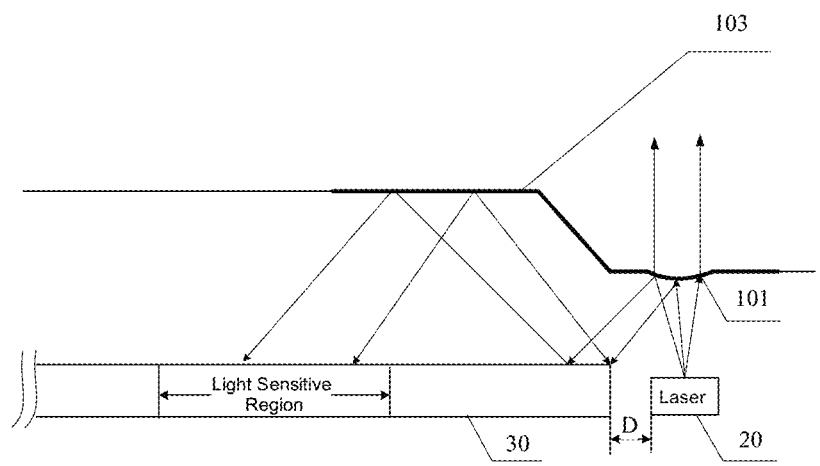
FIG. 5 is a schematic diagram illustrating an inner reflection optical path of the optical module according to the prior art.

FIG. 5 is a schematic diagram illustrating an inner reflection optical path of the optical module according to the prior art. As shown in FIG. 5, the laser 20 and the laser driving chip 30 in the prior optical module are both disposed on a circuit board, the lens component 10 is disposed above the laser 20 and the laser driving chip 30, and there are the transmitting lenses 101 disposed on an inner cavity wall, of the lens component 10, that faces towards the laser 20 and the laser driving chip 30. Therefore, in a working process of the optical module, a part of light emitted by the laser 20 may be reflected by the reflective film on a surface of the transmitting lens, and a part of the reflected light may hit the laser driving chip 30 on an edge of the same that is closer to the laser 20 (in this embodiment, this edge is referred to as an edge region of the laser driving chip), and may hit a wiring board between the laser driving chip 30 and the laser 20. The laser driving chip 30 may reflect secondarily the reflected light onto the inner cavity wall, of the optical lens component 10, that is around the transmitting lens (or, if the wiring board has a relatively high reflectivity, the wiring board may also reflect secondarily the light onto an inner cavity wall of a cavity of the optical lens component 10). Because there is the reflective film 103 coated on the inner cavity wall, a part of the light may be reflected again, and finally hit a non-edge region of the laser driving chip 30. As shown in FIG. 5, the reflected light in this embodiment finally hits a central region of the laser driving chip 30.

Figure 6:
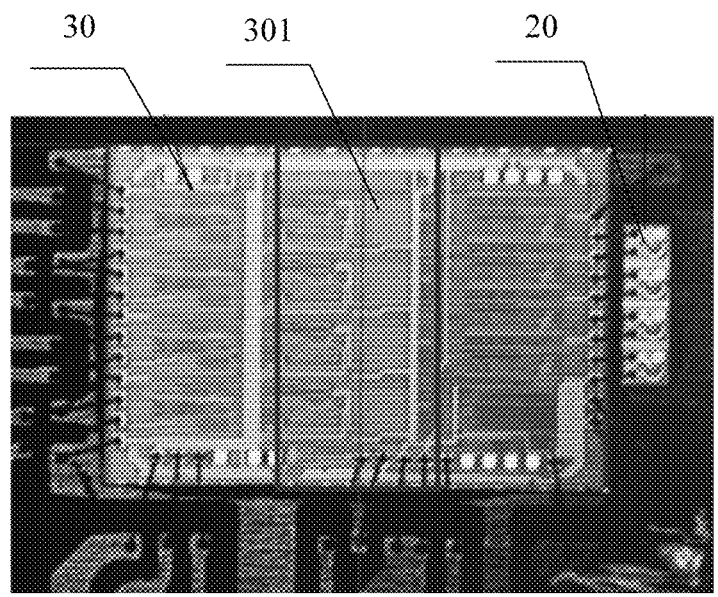
FIG. 6 is a schematic basic structural diagram illustrating a laser driving chip in the optical module.

FIG. 6 is a schematic basic structural diagram illustrating a laser driving chip in an optical module. As shown in FIG.

6, the laser driving chip 30 is usually provided with a CDR (clock data recovery) module 301 to optimize signal stability. The CDR module 301 is generally located in a region in the middle of the laser driving chip 30, and this region is referred to as a light sensitive region. The inventor finds that the CDR module 301 is essentially an integrated circuit, transmission of an internal signal is transmission of current, and the transmission of current is essentially transmission of an electron flow. Therefore, when a surface of the CDR module 301 is irradiated by the foregoing reflected laser light, additional electrons may be excited, so that an original current signal and performance of the CDR module 301 are affected, resulting in a degradation of a working signal of the laser driving chip 30, and finally a degradation of a working stability of the optical module.

After the optical transmitting lens in the lens component in the optical module is coated with a film, a part of the light emitted by the laser is reflected by the lens surface, a part of the reflected light may hit the laser driving chip on an edge-most place of the same that is closer to the laser, and the driving chip may in turn reflect the light to hit again the inner cavity wall of the lens unit. Because there is also a film coated on the inner cavity wall of the lens, the laser light may be reflected once again to finally irradiate the light sensitive region at a center of the laser driving chip where the CDR module is located, and thus normal working of the chip is affected. For the above problem, through a large amount of experimental verifications, according to an embodiment of the present application, an improved solution is provided: by means of design of a size of the coated film, less laser light or even no light is reflected to the light sensitive region of the driving chip, thereby improving the working stability of the optical module.

Specifically, the optical module provided in this embodiment includes an optical lens component 10 used by the transmitting end, a laser 20, and a laser driving chip 30. The laser 20 and the laser driving chip 30 are disposed on a circuit board (such as a printed circuit board and a flexible printed circuit board) in the optical module. A CDR module 301 is provided in a central region of the laser driving chip 30. Certainly, the CDR module 301 may also be disposed at another position. There may be a plurality of lasers 20, which are arranged side-by-side at one side of the driving chip 30. The optical lens component 10 is disposed above the laser 20 and the laser driving chip 30. In addition, an inner cavity wall in the lens component 10 that faces towards the laser 20 and the laser driving chip 30 is provided with at least one transmitting lens 101. Each of the lasers 20 corresponds to each of the transmitting lenses 101. A light-emitting cavity surface of the laser 20 is usually located at a position where a focal point of the transmitting lens 101 is located, and the laser light emitted by the laser 20 is collimated and converged through the transmitting lens 101, and is then reflected into a fiber by a reflective surface on the optical lens unit. Finally, an optical signal is transmitted out through a fiber.

Further, a surface of the transmitting lens 101 and an inner cavity wall of the optical lens component 10 around the transmitting lens 101 are coated with the reflective film 103. Moreover, all or a part of the reflective film 103 is located outside a region, of the inner cavity wall of the lens component 10, which is irradiated by a laser beam reflected by the laser driving chip 30, that is, after a part of the laser light emitted by the laser 20 is reflected by the surface of the transmitting lens 101, the reflected laser light by the transmitting lens 101 is reflected secondarily by the laser driving chip or by the laser driving chip and the wiring board to irradiate the inner cavity wall of the lens component 10, wherein there is no reflective film 103 coated on a part or entire of the region, of the inner cavity wall of the lens component 10, which is irradiated by the secondarily reflected laser light. Specifically, because the lens component has a relatively small size while uniformity of the film coated onto the surface of the transmitting lens 101 needs to be considered, a lower limit value of the size of the reflective film 103 needs to be set according to film coating accuracy at the same time, that is, under the premise of ensuring the uniformity of the film coated onto the surface of the transmitting lens 101 and an illuminance sensitivity of the CDR module, there need be as little as possible and preferably no reflective film coated on the foregoing region of the inner cavity wall of the lens component 10 that is irradiated by the secondarily reflected laser light.

Because the part or entire of the region of the inner cavity wall of the lens component 10 that is irradiated by the secondarily reflected laser light is not coated with the reflective film 103, as compared with a manner according to the prior art that the foregoing region is entirely coated with the reflective film because a film-coating range is required to be as large as possible, in this embodiment of the present application the light reflected secondarily onto the inner cavity wall is further reflected in a random direction, so that intensity of the light reflected onto the non-edge region of the laser driving chip 30 is reduced. In this way, performance of the clock data recovery circuit in the non-edge region of the laser chip is prevented from being interfered by excessive laser irradiation, thereby improving the work stability of the optical module.

On the basis of the foregoing design idea, this embodiment further provides a specific size designing manner of the film-coating range. Specifically, according to characteristics of the laser and the laser driving chip in the optical module, such as dimensions, position arrangements, and the like, it is designed that a distance, from a boundary of the reflective film 103 on a side closer to the laser driving chip 30 to a center of the transmitting lens 101, is less than a distance from an outermost secondary reflection-based irradiation point to the center of the transmitting lens 101, wherein the outermost secondary reflection-based irradiation point is an irradiation point, onto the inner cavity wall of the lens component 10, formed by reflecting secondarily a laser beam corresponding to a maximum divergence angle of the laser.

Figure 7:
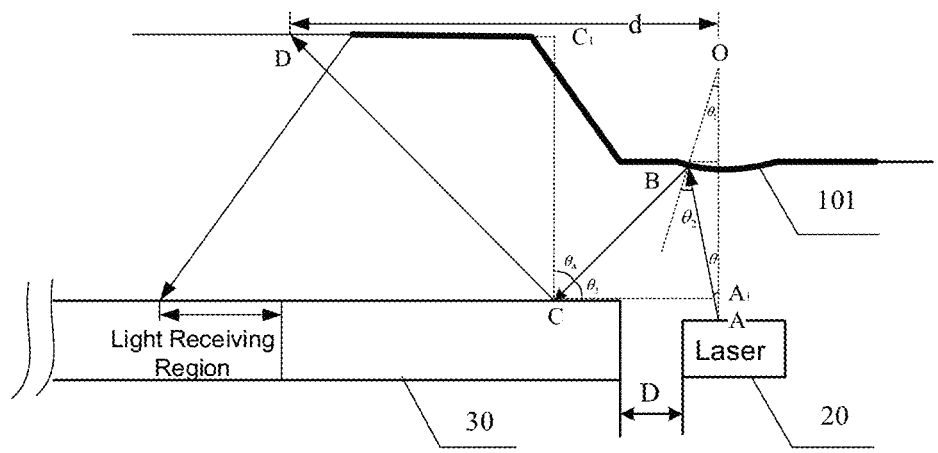
FIG. 7 is a diagram illustrating an optical path after a film coating area with a reflective film is reduced according to an embodiment of the present application.

FIG. 7 is a diagram illustrating an optical path after a film coating area with a reflective film is reduced according to an embodiment of the present application. As shown in FIG. 7, the light beam corresponding to the maximum divergence angle of the laser is reflected to a point C at an edge of the laser driving chip 30, and is then reflected again to a point D on the inner cavity wall of the lens component 10. If there is a reflective film coated on this point D, the reflected laser light may hit the light sensitive region in the middle of the laser driving chip 30. Therefore, if the film coating area is designed to be within this boundary, the light beam corresponding to the maximum divergence angle of the laser and a part of a light beam corresponding to an angle smaller than the maximum divergence angle would not be reflected to, at a second time, the laser driving chip 30 so that a light receiving area in the light sensitive region on the laser driving chip 30 is reduced.

It should be noted that the foregoing provides merely an upper limit value of a film coated boundary, and a lower limit value thereof is set according to the film coating accuracy and the illuminance sensitivity of the CDR module. Preferably, an edge of the reflective film flushes with an edge of the transmitting lens.

This embodiment further provides a specific size calculation formula of the film-coating range, for reducing the light receiving area in the light sensitive region on the laser driving chip 30. Specifically, an upper limit value of a boundary value of the coated film is represented by a distance from an outermost secondary reflection-based irradiation point on the inner cavity wall of the lens component to the center of the transmitting lens. As shown in FIG. 7, the distance satisfies that $d=A_1C+C_1D$. Because the light-emitting cavity surface of the laser 20 and an upper surface of the laser driving chip 30 are almost in a same plane, in this embodiment, the two are deemed to be approximately in a same plane. Correspondingly, $d \approx AC+C_1D$.

$$AC = \frac{AB\sin\theta_2}{\sin\theta_3} = \frac{f_1 \sin 2\theta_2}{\cos(2\theta_2 - \theta)\cos\theta} \quad (1)$$

$$C_1D = h_1 * \tan\theta_4 = \frac{h_1 * \sin(2\theta_2 - \theta)\cos\theta + f_1 \sin 2\theta_2}{\cos(2\theta_2 - \theta)\cos\theta} \quad (2)$$

$$\theta_2 = \theta + \theta_1 = \theta + \arctan\frac{f_1 \tan\theta}{R} \quad (3)$$

In formulas (1) to (3), $h_1$ indicates a distance between the inner cavity wall of the lens component and the upper surface of the laser driving chip, R indicates a curvature radius of the transmitting lens, $f_1$ indicates a distance between the surface of the transmitting lens and the light-emitting cavity surface of the laser, and $\theta$ indicates the maximum divergence angle of the laser.

From formulas (1) to (3), it may be derived that $$d = f(h_1, R, f_1, \theta) = \frac{h_1 * \sin(2\theta_2 - \theta)\cos\theta + f_1 \sin 2\theta_2}{\cos(2\theta_2 - \theta)\cos\theta}, \text{ and}$$

$$\theta_2 = \theta + \arctan\frac{f_1 \tan\theta}{R}.$$

Therefore, it may be designed that the distance, between the boundary of the reflective film on the side closer to the laser driving chip and the center of the transmitting lens, is less than $f(h_1, R, f_1, \theta)$. It is verified through experiments that by designing the film-coating range according to the foregoing formulas, light, in the light beam corresponding to the maximum divergence angle of the laser and in a part or all of the light beam corresponding to an angle smaller than the maximum divergence angle, that are reflected onto the inner cavity wall of the optical lens component may be further reflected in the random directions. In this way, performance interference caused by light reflected to the clock data recovery circuit is reduced, thereby improving the work stability of the optical module.

Further, in conjunction with curvature and size designs of the transmitting lens 101, according to an embodiment of the present application, a calculation process is further provided, where the transmitting lens 101 is deemed approximately as exhibiting a plane reflection, correspondingly $\theta=\theta_2=\theta_4$.

According to the foregoing approximation, $$AC=2f_1*\tan\theta \quad (4)$$

$$C_1D=h_1*\tan\theta \quad (5)$$

From formulas (4) and (5), it may be derived that $d=f(h_1, f_1, \theta)=(2f_1+h_1)\tan\theta$. Therefore, it may be designed that the distance, between the boundary of the reflective film on the side closer to the laser driving chip and the center of the transmitting lens, is less than $f(h_1, f_1, \theta)$.

Figure 8:
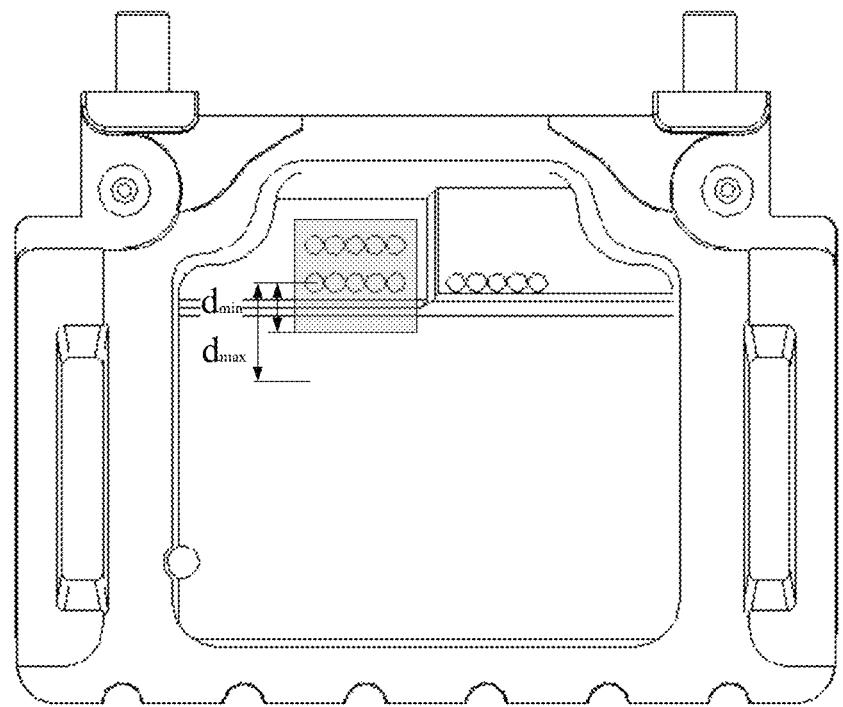
FIG. 8 is a schematic diagram illustrating a film coating range for a surface of a transmitting lens according to an embodiment of the present application.

FIG. 8 is a schematic diagram illustrating a film coating range for a surface of a transmitting lens according to an embodiment of the present application. According to the prior optical module, a distance between the laser and the laser driving chip is typically 0.03~0.150 mm, a divergence angle of the laser is 26~32°, a distance between the light-emitting cavity surface of the laser and the surface of the transmitting lens is typically 0.25~0.45 mm, and an aperture of the transmitting lens is typically 250 μm. As shown in FIG. 8, by using the foregoing calculation formulas, in order to ensure that the distance between the boundary of the reflective film and the center of the transmitting lens is smaller than the distance between the outermost secondary reflection-based irradiation point on the inner cavity wall of the lens component and the center of the transmitting lens, it may be designed that the distance, between the side of the reflective film that is closer to the laser driving chip and the center of the transmitting lens, is less than 2.5 mm. Meanwhile, in consideration of limits to prior film coating processes, in order to ensure the uniformity of the film coated onto the surface of the transmitting lens, the distance between the boundary of the reflective film and the center of the transmitting lens needs to be greater than 0.5 mm. In this way, in subsequent film coating processing, at the side that is closer to the laser driving chip, it may be required that the film cannot be coated at a distance in a range of 0.5~2.5 mm from the center of the transmitting lens, so as to reduce laser light that is reflected to, at the second time, the light sensitive region in the driving chip.

Further, in order to achieve an objective of reducing the laser light that is reflected to, at the second time, the light sensitive region in the driving chip as possible, on the basis of the foregoing reducing of film coating area, according to the embodiment of the present application, it is further proposed to improve a structure of spaces among the laser, the laser driving chip, and the lens unit.

First, an arrangement position of the laser 20 and the laser driving chip 30 are adjusted with regard to each other. The reflected light by the surface of the lens first hits the laser driving chip 30 at an edge-most position is closer to the laser 20. Therefore, in this embodiment, in consideration of an internal space margin of the optical module and a tolerance of influence on signal transmission, the distance between the laser 20 and the laser driving chip 30 may be increased. In this way, the light reflected onto the surface of the laser driving chip 30 is reduced, and them light reflected by the laser driving chip 30 onto the inner cavity wall of the lens component 10 is also reduced correspondingly.

Figure 9:
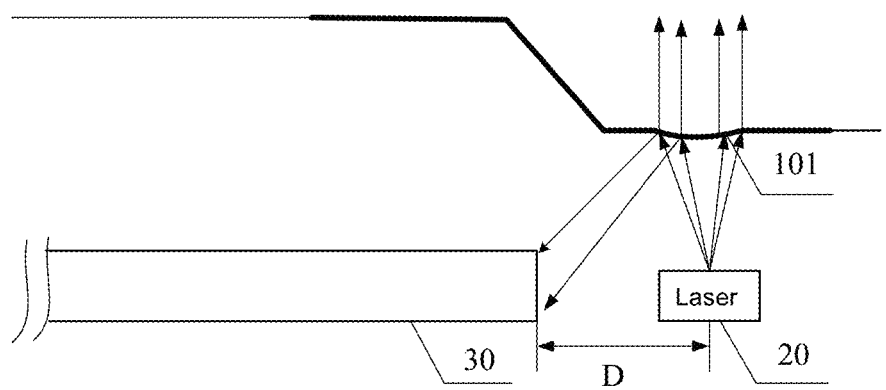
FIG. 9 is a diagram illustrating an optical path after a distance between a laser and a laser driving chip is increased according to an embodiment of the present application.

Preferably, by increasing the distance between the laser 20 and the laser driving chip 30, it is possible that the laser beam corresponding to the maximum divergence angle of the laser 20 cannot be reflected to the laser driving chip 30. FIG. 9 is a diagram illustrating an optical path after a distance between a laser and a laser driving chip is increased according to an embodiment of the present application. As shown in FIG. 9, after the distance between the laser 20 and the laser driving chip 30 is increased, the whole laser beam reflected by the lens cannot be irradiated onto the surface of the laser driving chip 30, so that laser light that is reflected by the reflective film to, at the second time, the light sensitive region in the driving chip is significantly reduced.

This embodiment further provides a calculation formula of a corresponding distance between the laser 20 and the laser driving chip 30 when controlling that the laser beam corresponding to the maximum divergence angle of the laser 20 cannot be reflected to the laser driving chip 30. Specifically, when the laser light reflected by the reflective film is exactly irradiated onto the edge of the laser driving chip 30, the corresponding distance D between the laser 20 and the laser driving chip 30 is expressed as:

$$D = f(R, f_1, \theta) = \frac{AB\sin\theta_2}{\sin\theta_3} = \frac{f_1 \sin 2\theta_2}{\cos(2\theta_2 - \theta)\cos\theta} \quad (6)$$

Where $\theta_2 = \theta + \arctan\frac{f_1 \tan\theta}{R}$,

R indicates a curvature radius of the transmitting lens, $f_1$ indicates a distance between the surface of the transmitting lens and the light-emitting cavity surface of the laser, and θ indicates the maximum divergence angle of the laser.

According to the foregoing formula (6), in actual applications, a distance between the laser driving chip and a center of the laser needs to be designed to be greater than or equal to $$\frac{f_1 \sin 2\theta_2}{\cos(2\theta_2 - \theta)\cos\theta}.$$

It should be noted that the center of the laser 20 described in this embodiment specifically refers to a center of the light-emitting cavity surface of the laser.

In addition, this embodiment further provides a calculation formula, where the transmitting lens is deemed approximately as exhibiting a plane reflection, and details are as follows:

$$D = f(h_2, f_1, \theta) = (f_1 + h_2)\tan\theta \quad (7)$$

Where $h_2$ indicates a distance, in a vertical direction, between the laser driving chip and the transmitting lens; $f_1$ indicates a distance between the surface of the transmitting lens and the light-emitting cavity surface of the laser; and θ indicates the maximum divergence angle of the laser.

According to the foregoing formula (7), in actual applications, the distance between the laser driving chip and the center of the laser needs to be designed to be greater than or equal to $(f_1+h_2)$ tan θ.

On the basis of the foregoing technical idea of controlling the laser beam reflected by the reflective film to be reflected onto the surface of the laser driving chip 30 as less as possible, a manner of decreasing a light emission angle of the laser 30 and a manner of decreasing a focal length of the transmitting lens 101 may also be adopted.

Figure 10:
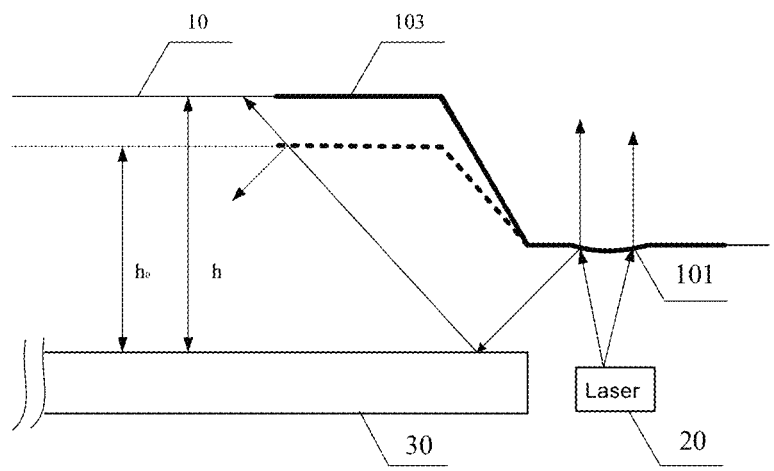
FIG. 10 is a diagram illustrating an optical path after a distance between an inner cavity wall of a lens component and a laser driving chip is increased according to an embodiment of the present application.

Further, this embodiment further provides a manner of increasing a distance between the laser driving chip 30 and the inner cavity wall of the lens component 10, so that a laser beam reflected by the laser driving chip 30, as less as possible, is irradiated onto the reflective film 103 on the inner cavity wall of the lens unit. FIG. 10 is a diagram illustrating an optical path after a distance between an inner cavity wall of a lens component and a laser driving chip is increased according to an embodiment of the present application. As shown in FIG. 10, corresponding to the reflective film 103 with an identity area, after the distance between the inner cavity wall of the lens component and the laser driving chip is increased (two different distances are designed in FIG. 10, and h>h0), a part of the laser beam reflected by the laser driving chip 30 may become irradiated onto a region without the reflective film. In this way, a light beam that is reflected to, at a second time, the laser driving chip 30 may be accordingly reduced.

Further, this embodiment further provides a calculation formula of the distance between the inner cavity wall 10 of the lens component and the upper surface of the laser driving chip 30 when reducing the light beam that is reflected to the reflective film 103 by the laser driving chip 30. Preferably, when the light beam corresponding to the maximum divergence angle of the laser 20 is exactly reflected to the edge of the reflective film 103, and the light-emitting cavity surface of the laser 30 and the upper surface of the laser driving chip 30 are approximately in a same plane, a calculation formula of a corresponding distance h therebetween is shown as follows:

$$h = f(d, R, f_1, \theta) = \frac{d^*\cos(2\theta_2 - \theta)\cos\theta - f_1 \sin 2\theta_2}{\sin(2\theta_2 - \theta)\cos\theta} \quad (8)$$

Where $$\theta_2 = \theta + \arctan\frac{f_1 \tan\theta}{R},$$

d indicates the distance between the boundary of the reflective film and the center of the transmitting lens, R indicates the curvature radius of the transmitting lens, $f_1$ indicates the distance between the surface of the transmitting lens and the light-emitting cavity surface of the laser, and θ indicates the maximum divergence angle of the laser.

According to formula (8), if it is possible so that the laser beam reflected by the laser driving chip 30 is irradiated onto the reflective film 103 on the inner cavity wall of the lens component as less as possible, the distance between the inner cavity wall of the lens component 10 and the upper surface of the laser driving chip 30 needs to be greater than or equal to f(d, R, $f_1$, θ).

In addition, this embodiment further provides a calculation formula of approximating the transmitting lens as exhibiting a plane reflection, and details are as follows:

$$h = f(d, f_1, \theta) = \frac{d}{\tan\theta} - 2f_1 \quad (9)$$

Where d indicates the distance between the boundary of the reflective film and the center of the transmitting lens, $f_1$ indicates the distance between the surface of the transmitting lens and the light-emitting cavity surface of the laser, and θ indicates the maximum divergence angle of the laser.

According to formula (9), if the laser beam reflected by the laser driving chip 30 is enabled to be irradiated onto the reflective film 103 at the inner cavity wall of the lens component as less as possible, the distance between the inner cavity wall of the lens component 10 and the upper surface of the laser driving chip 30 needs to be greater than or equal to $$\frac{d}{\tan\theta} - 2f_1.$$

It is proposed according to the foregoing embodiments that laser light reflected to the light sensitive region of the laser driving chip is reduced directly by reducing a film coating area without changing sizes of elements of the optical module. In addition, the embodiments further provide two design manners of adjusting structures of the spaces among the laser, the laser driving chip, and the lens component without degrading use effects of the optical module, and the two manners may be combined with the manner of reducing the film coating area, so that less or even no laser light is reflected again onto the CDR module of the laser driving chip, thereby improving the work stability of the optical module.

Further, in specific embodiments, the laser driving chip itself may be also designed so as to reduce an influence of light exerted by reflection at a second time on the laser driving chip. For example, a high-reflectivity film is coated on a region of the laser driving chip where the clock data recovery circuit is located, so that laser light is reflected away again to reduce light absorption; or a light isolation element may be further disposed above the laser driving chip to isolate laser light performed with a secondary reflection.

Embodiments in this specification are all described in a progressive manner. For same or similar parts between the embodiments, reference may be made to each other. For each embodiment, emphasis is put on differences between this embodiment and other embodiments. Particularly, the device and system embodiments are basically similar to the method embodiments, and are thus relatively simply described. For related parts, the corresponding descriptions in the method embodiments may be referred to. The device and system embodiments described above are merely exemplary. Units described as separated parts may be or may not be physically separated; and parts displayed as a unit may be or may not be a physical unit, that is, may be located at one place or may be distributed on a plurality of network units. The objectives of the solutions of the embodiments can be achieved by choosing some or all of the modules according to actual requirements, which can be understood and implemented by persons of ordinary skills in the art without an effective effort.

The present application has been described above with respect to merely specific implementations. It should understand that persons of ordinary skills in the art may make various improvements and modifications without departing from the principles of the present application, which should also be considered as being subject to the protection scope of the present application.

What is claimed is:

1. An optical module, comprising:
a laser and a laser driving chip that are disposed on a circuit board, and
a lens component disposed above the laser and the laser driving chip, wherein
the lens component is provided with a transmitting lens for collimating and converging laser light emitted by the laser on an inner cavity wall of the lens component that faces towards the laser and the laser driving chip, and a surface of the transmitting lens and the inner cavity wall around the transmitting lens are coated with a reflective film;
the laser driving chip is provided with a clock data recovery circuit in a non-edge region thereof, and
the optical module is configured to reflect, by the reflective film on the surface of the transmitting lens, a part of the laser light emitted by the laser, and reflect secondarily, by an edge region of the laser driving chip, the laser light reflected by the reflective film to be irradiated onto the inner cavity wall of the lens unit, wherein there is no reflective film coated on a part or entire of a region, of the inner cavity wall of the lens unit, which is irradiated by the secondarily reflected laser light,
wherein a region of the laser driving chip where the clock data recovery circuit is located is coated with a high-reflectivity film.

2. The optical module according to claim 1, wherein a distance between a boundary, of the reflective film on a side closer to the laser driving chip, and a center of the transmitting lens is 0.5~2.5 mm.

3. The optical module according to claim 1, wherein the clock data recovery circuit is disposed in a central region of the laser driving chip.

4. The optical module according to claim 1, wherein a distance between the laser driving chip and a center of the laser is greater than or equal to f (R, $f_1$,θ)

$$f(R, f_1, \theta) = \frac{f_1 \sin 2\theta_2}{\cos(2\theta_2 - \theta)\cos\theta}, \quad \theta_2 = \theta + \arctan\frac{f_1 \tan\theta}{R},$$

wherein R indicates a curvature radius of the transmitting lens, $f_1$ indicates a distance between the surface of the transmitting lens and a light-emitting cavity surface of the laser, and θ indicates a maximum divergence angle of the laser.

5. An optical module, comprising:
a laser and a laser driving chip that are disposed on a circuit board, and
a lens component disposed above the laser and the laser driving chip, wherein
the lens component is provided with a transmitting lens for collimating and converging laser light emitted by the laser on an inner cavity wall of the lens component that faces towards the laser and the laser driving chip, and a surface of the transmitting lens and the inner cavity wall around the transmitting lens are coated with a reflective film;
the laser driving chip is provided with a clock data recovery circuit in a non-edge region thereof, and
the optical module is configured to reflect, by the reflective film on the surface of the transmitting lens, a part of the laser light emitted by the laser, and reflect secondarily, by an edge region of the laser driving chip, the laser light reflected by the reflective film to be irradiated onto the inner cavity wall of the lens unit; and
a distance between a boundary of the reflective film on a side closer to the laser driving chip and a center of the transmitting lens is less than f (R, $f_1$,θ),
wherein $$f(h_1, R, f_1, \theta) = \frac{h_1 * \sin(2\theta_2 - \theta)\cos\theta + f_1 \sin 2\theta_2}{\cos(2\theta_2 - \theta)\cos\theta},$$

$$\theta_2 = \theta + \arctan\frac{f_1 \tan\theta}{R},$$

$h_1$ indicates a distance between the inner cavity wall of the lens component and an upper surface of the laser driving chip, R indicates a curvature radius of the transmitting lens, $f_1$ indicates a distance between the surface of the transmitting lens and a light-emitting cavity surface of the laser, and θ indicates a maximum divergence angle of the laser,
wherein a region of the laser driving chip where the clock data recovery circuit is located is coated with a high-reflectivity film.

6. The optical module according to claim 5, wherein the clock data recovery circuit is disposed in a central region of the laser driving chip.

\* \* \* \* \*